May 26, 1970

G. E. BENNETT ET AL  3,514,724

MAGNETOELASTIC SIGNAL PROCESSING APPARATUS

Filed Sept. 18, 1967  2 Sheets-Sheet 1

INVENTORS
GLENN E. BENNETT
FRANK A. OLSON

BY *Townsend & Townsend*
ATTORNEYS

INVENTORS
GLENN E. BENNETT
FRANK A. OLSON

BY Townsend & Townsend
ATTORNEYS

United States Patent Office 3,514,724
Patented May 26, 1970

3,514,724
MAGNETOELASTIC SIGNAL PROCESSING APPARATUS
Glenn E. Bennett, Menlo Park, and Frank A. Olson, Palo Alto, Calif., assignors to Teledyne, Inc., Hawthorne, Calif., a corporation of Delaware
Filed Sept. 18, 1967, Ser. No. 668,553
Int. Cl. H03h 7/30, 9/30
U.S. Cl. 333—30                                6 Claims

ABSTRACT OF THE DISCLOSURE

A magnetoelastic signal processing apparatus is described formed of a YIG rod with a polished end beveled with respect to the rod axis for converting between transversely propagating longitudinal elastic waves and axially propagating shear elastic waves. A transducer coupling assembly is provided on the side of the rod on a transverse path intersecting the beveled end for converting between microwave energy and longitudinal elastic waves, and a transducer coupling assembly is provided along the length of the rod for magnetoelastic conversion between microwave energy and shear elastic wave energy. The magnetic field for biasing the YIG rod can be arranged with respect to the rod axis at a small angle toward the normal to the beveled end face.

---

The present invention is directed in general to a magnetoelastic signal processing apparatus and more particularly to a two-port magnetoelastic delay device wherein energy is propagated through the device using longitudinal elastic waves and shear elastic waves and conversion between elastic waves within the material.

The magnetoelastic mode of propagation in the nonuniform magnetic field region of an axially magnetized yttrium-iron-garnet, commonly referred to as YIG, provides real time dispersive delays in the order of microseconds for microwave signals.

A number of techniques have been utilized for propagation excitation of YIG materials. These techniques include fine wire antennae, coupling loops, and cavities. While a number of structures have been employed for propagation and time delay, such as YIG materials in which an input and an output port are provided at a common location on the material and a signal generated within the material reflected thereto, the practical use of magnetoelastic waves in a microwave dispersive delay device requires that two ports, or terminal pairs, isolated from one another, be available.

Several constructions which can be operated as two-port devices with spaced apart coupling assemblies have been proposed. Certain of these constructions employ a combination of YIG and yttrium-aluminum-garnet, commonly referred to as YAG. Proposed constructions include end-to-end assembly of YIG-YAG-YIG and YAG-YIG-YAG. The construction of these devices requires complex assembly techniques for the YIG and YAG and often critical dimensions for one or more of the separable sub-elements.

Other coupling assemblies are described in U.S. Pat. 3,309,628 by F. A. Olson and directed to a variable delay line wherein one of the regions for coupling microwave energy to the YIG is moved for changing the propagation time of the microwave signal between the coupling regions to and from the YIG. In this patent, one two-port coupling arrangement includes a pair of coupling antennae in a device in which the internal field within the YIG is reduced between the two coupling assemblies. It is difficult to produce this field arrangement and also to isolate the input and output signals of the two coupling assemblies. This patent also describes the use of a shear elastic wave transducer as one port and an antenna as the other port. This configuration is successful but is limited in practice to the lower microwave range by the difficult technology of microwave-shear transducers.

The object of the present invention is to provide a magnetoelastic delay device which overcomes the difficulties with prior art devices.

Broadly stated, the present invention is directed to a delay apparatus including a ferrimagnetic material, means for establishing longitudinal elastic waves in one portion of the material and shear elastic waves in another portion of the material with provision for conversion between longitudinal and shear waves at a boundary of the material and means for coupling microwave energy to and from the material.

The conversion between longitudinal and shear elastic waves is accomplished by orienting a boundary portion of the ferrimagnetic material at an appropriate angle between the propagation paths of longitudinal and shear elastic waves for conversion between such waves at the boundary.

While the invention can take a number of configurations, one operative embodiment takes the form of a ferrimagnetic rod such as YIG magnetized substantially axially and having one end face beveled at the appropriate angle with respect to the rod axis for converting between longitudinal elastic waves propagating transversely of the rod axis and shear elastic waves propagating axially of the rod. A longitudinal elastic wave transducer such as a CdS transducer is provided as one port on the outside surface of the rod adjacent the beveled end for converting microwave electronic energy to longitudinal elastic wave energy propagating along a path intersecting the beveled end face, and a coupling assembly such as a magnetic coupling antenna is provided as the other port at a position spaced axially of the rod from the beveled end face in the magnetoelastic conversion region. Input microwave energy applied to the rod at either port propagates by the appropriate elastic wave to the beveled end of the rod at which the energy is converted to the other type of elastic wave which then propagates to the other port at which output microwave energy is established.

This construction of a two-port magnetoelastic delay apparatus is easy to construct, provides appropriate isolation between coupling assemblies, and avoids the problems with prior art structures as described above. With the construction of the present invention, various types of microwave signal processing devices can be accomplished such as variable delay devices and pulse compression and expansion devices.

The fact that only a single magnetoelastic conversion is utilized simplifies the problem of magnetic field profile synthesis for desired delay dispersion characteristics. Additionally, with the present invention the elastic and magnetic terminals can be physically isolated and thus achieve a higher degree of leakage suppression than can be obtained with orthogonal magnetic couplers located at a single YIG end face. Also, in applications such as pulse compression, desired amplitude characteristics can be built directly into the transducer.

In accordance with another aspect of the present invention, the axial bias magnetic field for the ferrimagnetic material is canted slightly, less than 10°, toward the normal to the beveled mode conversion surface. This arrangement compensates for field distortions that exist due to the beveled mode conversion surface.

Other objects and advantages of this invention will become apparent when reading the following description and referring to the accompanying drawings in which similar characters of reference represent corresponding parts in each of the several views.

Figure 1:
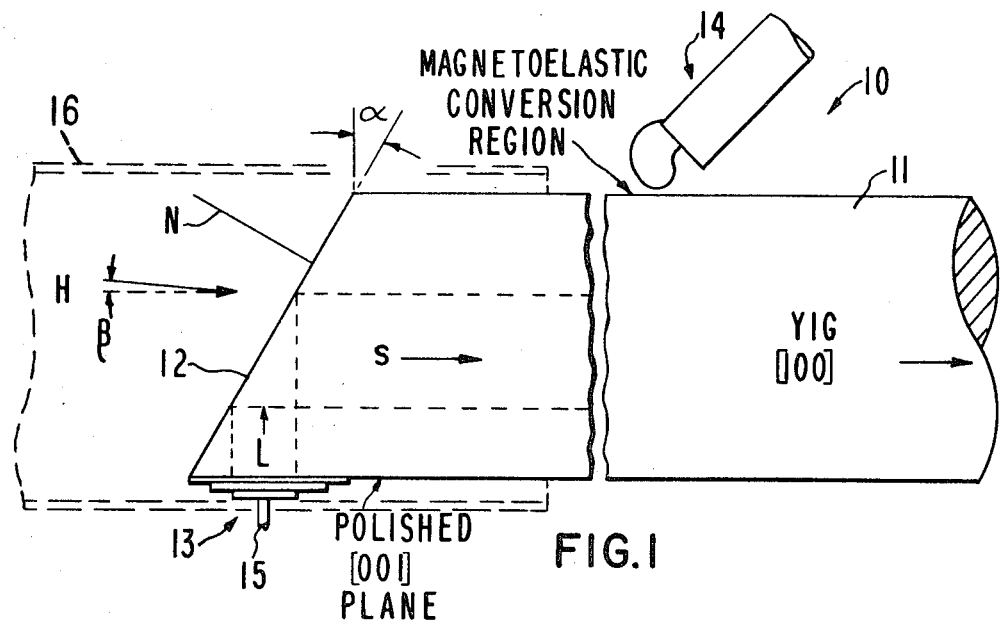
FIG. 1 is a side elevational schematic view of a signal processing assembly in accordance with the present invention.

It will be appreciated that the present invention can be constructed in a number of different configurations, but for simplicity sake, one preferred embodiment of the present invention will be described and illustrated.

As shown in the drawings, the signal processing assembly includes a [100] single crystal YIG rod 11 with a ground and polished end face 12 of the rod 11 beveled at an angle $\alpha$ from a normally transverse end plane for providing the proper mode conversion surface as described in greater detail below.

A substantially axial biasing magnetic field H is provided by conventional means such as an electromagnet with the field canted slightly, at an angle $\beta$, less than 10°, toward the normal N to the mode conversion surface 12.

For two-port operation of the device, first and second ports 13 and 14 are provided. As shown, the first port 13 takes the form of a longitudinal elastic wave transducer such as a CdS or ZnO transducer on the polished [001] surface of the YIG rod 11 for converting between microwave energy in an external line 15 and longitudinal elastic wave energy propagating along a path from the transducer 13 to the beveled end face 12.

In the embodiment shown, the second port 14 for coupling between the wave energy in the rod 11 and microwave energy in an output line takes the form of a coupling antenna spaced along the axial length of the rod 11 for conventional spinwave detection at a magnetoelastic conversion region of the rod after an intermediate shear elastic wave, propagating on a path from the mode conversion surface 11, has undergone magnetoelastic conversion.

The invention operates on the principle of longitudinal-shear elastic wave conversion at the planar, stress-free boundary surface of the ferrimagnetic material.

Figure 2:
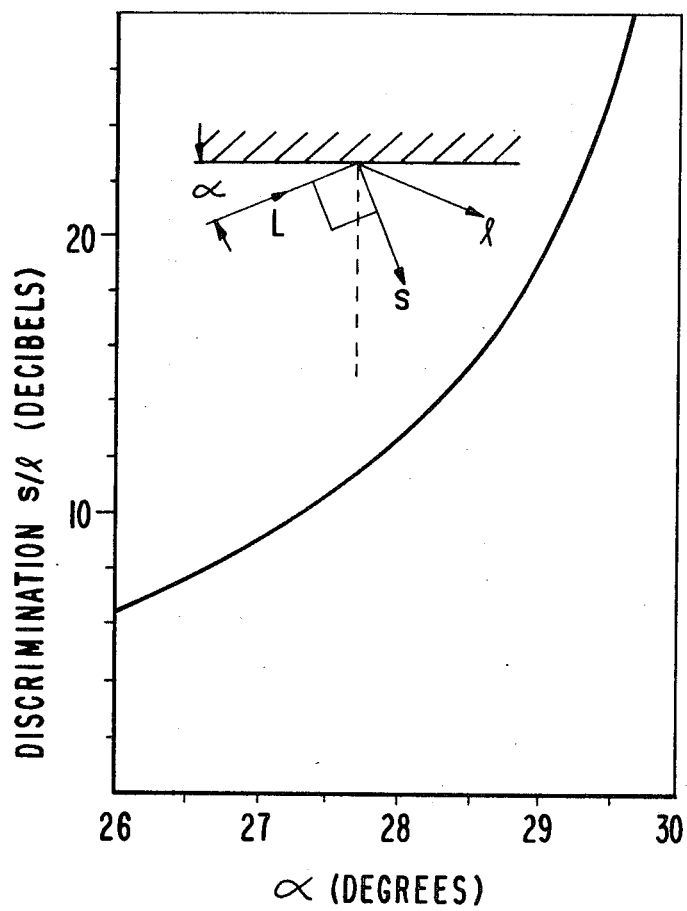
FIG. 2 is a graph of signal discrimination plotted against degrees of inclination for the beveled surface as schematically illustrated inset in the graph.

While it is not possible to obtain 100% longitudinal-shear conversion in YIG, the amplitude discrimination between reflected shear and longitudinal modes is fairly good. Under the pure mode axis restriction that the incident longitudinal wave (L) and the reflected shear wave (s) propagate along orthogonal directions, as indicated in FIG. 2, the amplitude discrimination is calculated to be $$\frac{l}{s} = \frac{1}{4}(\csc^2 \alpha - 2 \sec 2\alpha)$$

where $\alpha$ is determined from the relationship $$\tan \alpha = v_s/v_l$$

where $v_s$ and $v_l$ are the appropriate shear and longitudinal velocities. The discrimination given by the first equation above is plotted on a decibel scale in FIG. 2. The several distinct pairs of orthogonal pure mode crystalline axes in YIG yield values for $\alpha$ between 28 and 28.5° corresponding to discrimination ratios in the range 12.4 to 14.9 db. The apparent perfect discrimination at $\alpha = 30°$ is not available in YIG.

In a specific example, a round YIG rod 0.125 inch in diameter was provided as shown in FIG. 1 with an end face 12 ground and polished at $\alpha = 28.1°$ and a thin film CdS transducer deposited on the polished 001 surface. Crystallographic axes were determined by X-ray defraction. For ease of fabrication, the opposite end of the rod from end 12 was ground parallel to the mode conversion surface 12 but not polished. The overall length of the prepared crystal then measured 0.45 inch.

Figure 4:
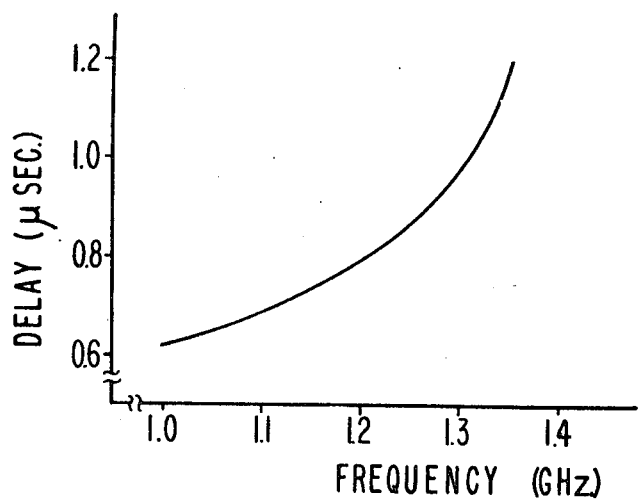
FIG. 4 is a graph of delay plotted against frequency for operation of a device in accordance with this invention with a fixed magnetic field.
Figure 3:
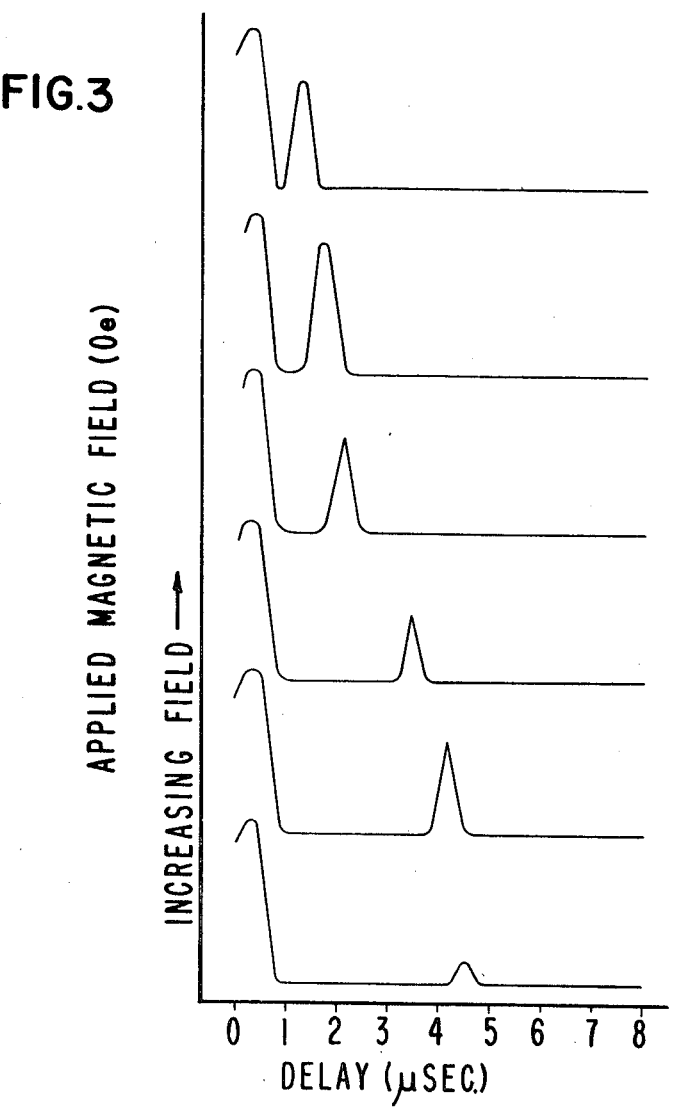
FIG. 3 is a graph of signal amplitude plotted versus time showing the input signal and output signal for a number of different applied magnetic fields.

The variable delay producible with the particular device just described is illustrated in FIG. 3 which displays pulses transmitted at 1250 mHz. as the axial magnetic field was varied to produce delay from less than 1 to greater than 4 microseconds with the highest field being less than 500 (oe.). A minimum insertion loss of 55 db and transmission in the frequency range 1000 to 1350 mHz. was observed, as shown in FIG. 4. These figures can be substantially improved by optimizing the longitudinal acoustic transducer, the electromagnetic coupling structure, and the microwave match to each. Leakage suppression may be achieved by suitable electromagnetic shielding and magnetic shunting.

The demagnetizing field produced by the asymmetrical YIG geometry does not interfere with magnetoelastic propagation to any important degree. The fact that only a single magnetoelastic conversion is utilized simplifies the problem of magnetic field profile synthesis for desired delay dispersion characteristics. It is possible to physically isolate the elastic and magnetic terminals in the configuration described here and to suppress energy leakage between these terminals by enveloping the elastic transducer end of the YIG rod in a magnetic shunt 16, indicated in phantom in FIG. 1. The resulting magnetic field profile prevents magnetostatic transfer of energy between the elastic transducer and the magnetic coupling structure. With the addition of electromagnetic shielding, it is possible to achieve a higher degree of leakage suppression than can be obtained with orthogonal magnetic couplers at a single YIG end-face.

Longitudinal elastic wave transducers have been prepared having conversion losses of only 5 db through L frequency band and 15 db at 11 gHz. By comparison, thin film shear wave transducers that might be deposited directly on a conventional YIG rod end-face are typically 5 to 10 db less efficient in L-band and are presently not feasible for operation at higher microwave frequencies.

Instead of variation of the applied magnetic field, the frequency of the applied signal can be varied for pulse compression or pulse expansion. FIG. 4 illustrates the delay dispersion of an L-band device constructed in accordance with the present invention. In applications such as pulse compression, desired amplitude characteristics can be built directly into the transducer.

The use of the canted biasing magnetic field has been found to compensate for field distortions existent due to the beveled mode conversion surface. Magnetic shunts can also be used or a magnetic field steering member with a complementary beveled end and magnetic properties similar to YIG placed in end-to-end relationship with the rod 11.

What is claimed is:

1. A signal processing apparatus comprising: a single crystal ferrimagnetic material; means for magnetically aligning portions of said material; means for establishing longitudinal elastic waves in one portion of said material; means for establishing shear elastic waves in another portion of said material; means for converting between longitudinal and shear elastic waves at a boundary of said material; and means for coupling microwave signal energy to and from said material at said one and another portions for propagation through said material as a longitudinal elastic wave in said one portion and as a shear elastic wave in said other portion.

2. A two-part magnetoelastic apparatus comprising: a single crystal ferrimagnetic rod having a polished end face beveled at an angle with respect to the rod axis for converting between transversely propagating longitudinal elastic waves and axially propagating shear elastic waves; means for magnetically aligning portions of said material with a magnetic field of a strength for magnetoelastic conversion of shear waves to mirowave energy; means defining a first port for conversion between microwave energy and a longitudinally elastic wave propagating along a path intersecting said beveled end face; and means defining a second port for magnetoelastic conversion between microwave energy and an axially propagating shear elastic wave propagating axially of said rod.

3. The apparatus in accordance with claim 2 wherein said magnetically aligning means includes means for establishing a bias magnetic field aligned at a slight angle from an axial direction toward the normal to said end face.

4. A two-part magnetoelastic apparatus comprising: in combination, a single crystal [100] oriented YIG rod having a polished end face beveled with respect to the axis of said rod for converting between longitudinal shear waves propagating substantially normal to the rod axis and shear elastic waves propagating substantially axially of said rod; means for providing a magnetic field aligned substantially axially of said rod; means for defining a first port for converting between microwave energy and a longitudinal elastic wave propagating along a [001] axis of said material intersecting said end face; means defining a second port for magnetoelastic conversion between microwave energy and shear elastic waves propagating substantially axially of said rod whereby in the propagation of microwave energy between said ports the microwave energy experiences a propagation time delay which varies as a function of frequency and magnetic field strength.

5. The apparatus of claim 4 wherein said magnetic field is aligned with respect to the rod axis at a small angle toward the normal to said beveled face.

6. The apparatus of claim 4 including a magnetic shunt positioned adjacent the beveled end-face of said rod.

References Cited

UNITED STATES PATENTS

| 3,254,317 | 5/1966 | Bauer | 333—30 |
| 3,309,628 | 3/1967 | Olson | 333—30 |

HERMAN KARL SAALBACH, Primary Examiner

P. L. GENSLER, Assistant Examiner

U.S. Cl. X.R.

333—24